Figure 1:
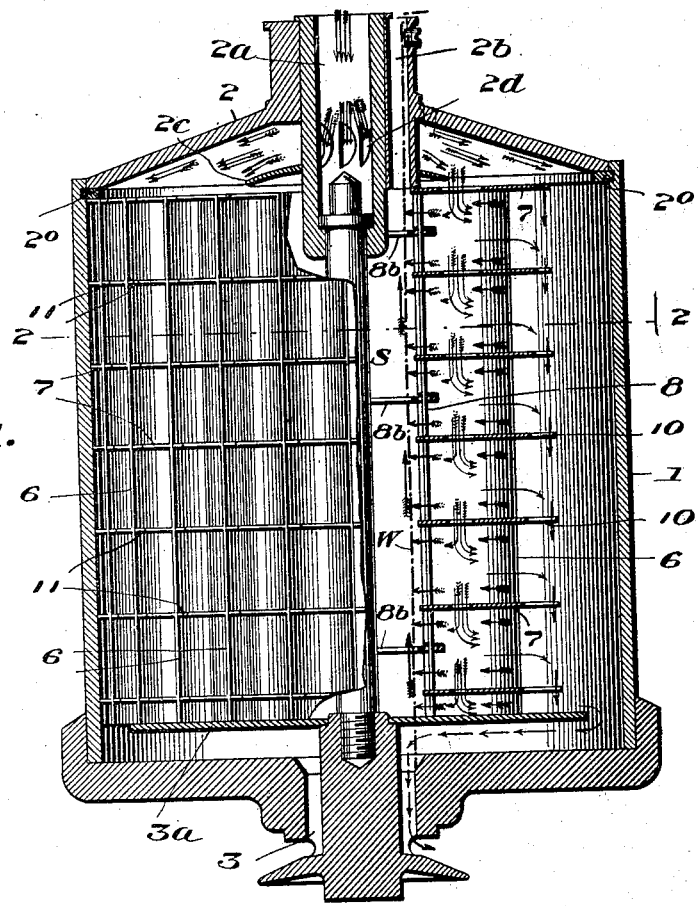

L. J. HEDDERICH.
SKIMMING DEVICE FOR CREAM SEPARATORS.
APPLICATION FILED MAR. 10, 1916.

1,208,960.

Patented Dec. 19, 1916.
2 SHEETS—SHEET 1.

Witness
Philip E. Barnes

Inventor
L. J. Hedderich
Alexander
Dowell
Attorneys

L. J. HEDDERICH.
SKIMMING DEVICE FOR CREAM SEPARATORS.
APPLICATION FILED MAR. 10, 1916.
1,208,960.
Patented Dec. 19, 1916.
2 SHEETS—SHEET 2.
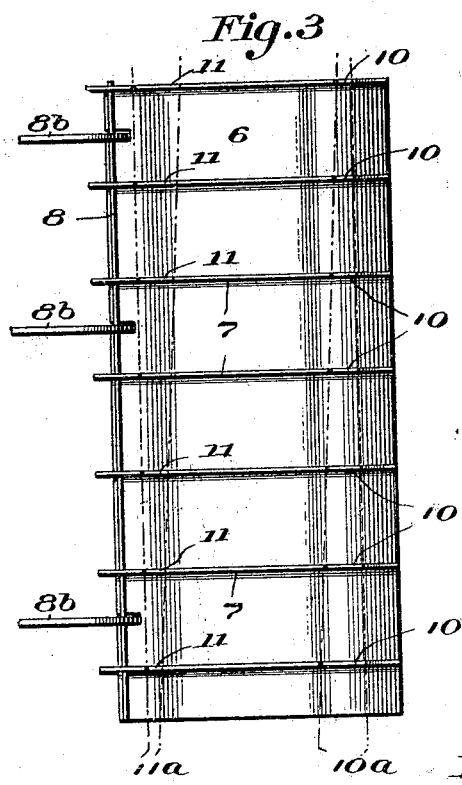
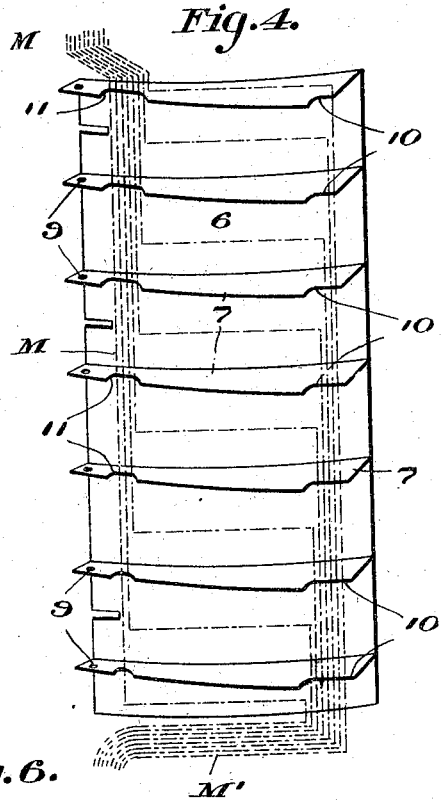
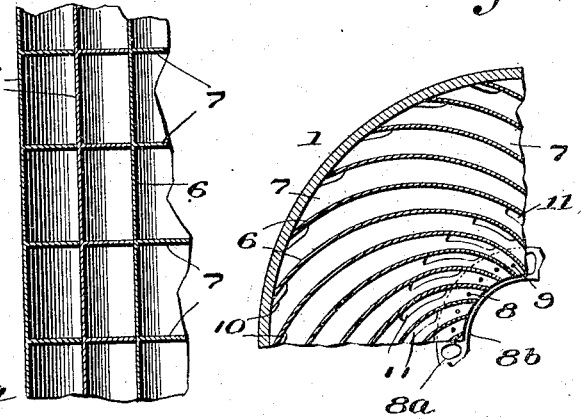
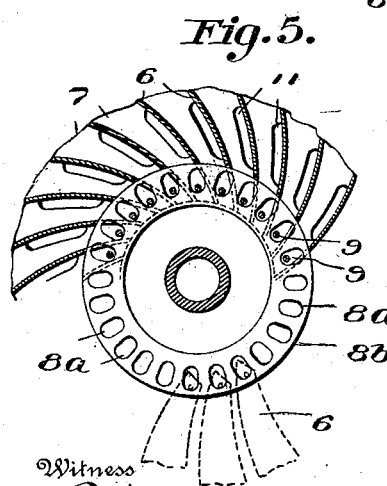
Inventor
L. J. Hedderich

UNITED STATES PATENT OFFICE.

LEANDER J. HEDDERICH, OF MULBERRY, INDIANA.

SKIMMING DEVICE FOR CREAM-SEPARATORS.

1,208,960.

Specification of Letters Patent.   Patented Dec. 19, 1916.

Application filed March 10, 1916.   Serial No. 83,249.

*To all whom it may concern:*

Be it known that I, LEANDER J. HEDDE-RICH, a citizen of the United States, residing at Mulberry, in the county of Clinton and State of Indiana, have invented certain new and useful Improvements in Skimming Devices for Cream-Separators; and I hereby declare that the following is a full, clear, and exact description thereof, reference being had to the accompanying drawings, which form part of this specification.

This invention is an improvement in centrifugal separators and its major object is to separate fluids such as milk and cream of different specific gravities, by introducing the fluid into a rotatable chamber having a superposed series of independent radial passages of similar size, whereby as the chamber is rotated the fluid is sub-divided into a number of similar small currents and the lighter fluid is separated from the heavier fluid and passes toward the axis of the chamber, while the heavier fluid moves toward the periphery of said chamber; the inlets of said passages gradually decreasing in size from one end of the series toward the other, and the outlets of said passages gradually increasing in size from one end of the series to the other, the outlet openings increasing in size as the inlet openings diminish, whereby each passage is compelled to carry an equal amount of fluid, and the fluid is thus caused to have a practically uniform rate of flow throughout the chamber or bowl and dead spaces are avoided.

The invention has particular reference to the liner or skimming device, and provides a novel liner or skimming device which will divide the milk in the bowl into numerous small slow currents, and compel the milk to pass evenly through all the channels; and will obviate channels of least resistance, which cause so called "bowl currents," which currents cause milk in other parts of the bowl to remain in dormant or dead zones.

Another object is to provide a liner or skimming device formed of independent members or wings which will equally divide the incoming milk and distribute same throughout the bowl in the channels between the wings; and cause each channel to take its proper portion of the inflow of milk, thus producing a uniform even flow in each channel and a comparatively very slow movement of fluid in any channel thus giving ample time for separation of the cream.

The accompanying drawings illustrate one embodiment of the invention, and I will describe the same with reference thereto, summarizing in the claims the essential features and combinations of parts for which protection is desired.

Figure 2:
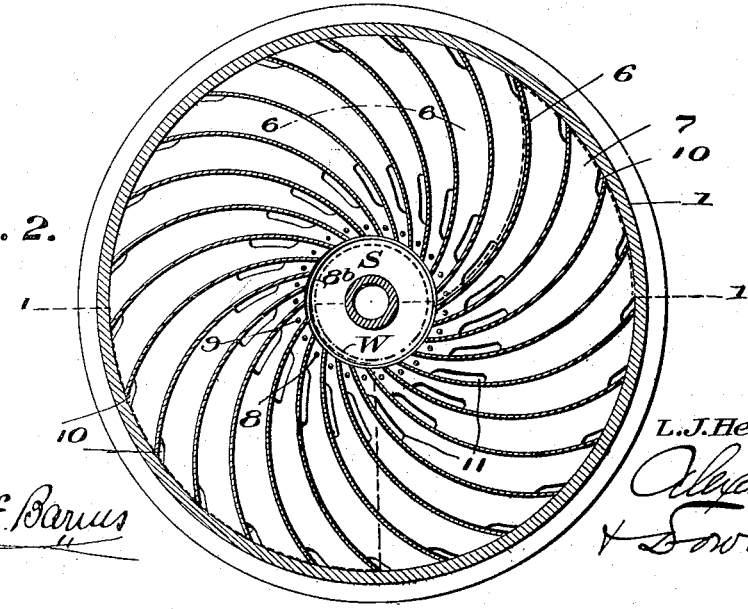

In said drawings, Figure 1 is a vertical sectional view taken on the irregular line 1—1 of Fig. 2 showing part of the liner in elevation and partly broken away. Fig. 2 is a transverse section on line 2—2 Fig. 1 with the liner complete. Fig. 3 is a detail face view of one of the wings showing the pivot rod and parts of the retaining rings. Fig. 4 is a diagrammatical view with dotted lines showing the distribution of the milk in passing from the inlet to the outlet. Fig. 5 is a detail section illustrating a few of the liner wings in operative position in full lines; and a few of the wings in cleansing position in dotted lines. Fig. 6 is an enlarged detail vertical section on line 6—6 Fig. 2. Fig. 7 is a detail sectional view showing a modified form of the wings.

The bowl may be of any desired construction and provided with any desired form of intake and exit for the milk, together with any suitable exit for the cream.

In the example shown in the drawings the bowl is provided with a top 2 having a milk passage $2^a$ and a cream outlet $2^b$. Said bowl has a spreader $2^c$ below top 2 over which are the milk inlets $2^d$. Said bowl is shown with a milk outlet 3 at bottom, and has a spreader disk $3^a$ above said outlet, but, as stated the particular bowl and arrangement of inlets and outlets are not essentials of the present invention, and such parts are merely conventionally shown in the drawings.

Within the bowl 1 is a novel liner consisting of a plurality of vertically disposed wings 6, one of which is shown detached in Fig. 3. Each of these wings may be made of sheet metal, or other suitable material, and to the front face of each wing are secured any desired number of horizontally disposed partitions or ribs 7. The uppermost rib 7 is preferably arranged at the top of the wing so that the top ribs will practically form a disk or support for the packing ring $2^e$ to rest upon. These ribs may be made wider or narrower according to the desired distance apart of adjacent wings 6, and a sufficient number of said wings are arranged in the bowl 1, according to the width of the ribs, as shown in Fig. 2, to completely fill the bowl as shown; and when in the bowl the front edges of the ribs 7 of one wing 6 must contact with the back of the next preceding wing throughout the full length of the rib, except at points where said rib may be notched to provide passageways for the flow of milk as hereinafter explained.

Preferably the wings 6 are curved as in Fig. 2, but they may be bent on hyperbolical curves (as in Fig. 7). The wings 6 are so arranged that they can open like the leaves of a book when the liner is removed from the bowl, so that they are then readily accessible for cleaning as indicated in dotted lines in Fig. 5.

The wings 6 do not depend upon any retainers to hold them in position while in the bowl as centrifugal force will cause each ribbed wing to lie closely against its neighbor, the wings thus substantially supporting each other, and making the whole liner, when in operation, extremely solid and rigid against relative yielding or motion of its parts; which yielding motion would be detrimental to the proper poising of the separator while in operation.

Each of the wings 6 may be held in place by any suitable means. As shown rods 8 are passed through openings 9 in the inner ends of the superposed ribs 7 (see Figs. 2, 3, 5); while the outer ends of the ribs and outer edges of the wings engage the inner wall of the bowl 1 when the bowl is in operation. The rods 8 are preferably loosely confined in openings $8^a$ in retaining rings $8^b$, said openings $8^a$ being larger than the rods 8 so as to permit the wings to readily adjust themselves to each other with the desired close fit when the liner is placed within the bowl; and when the liner is removed from the bowl these large openings allow the wings to be opened up and separated for cleaning as shown in Fig. 5.

Each of the ribs 7 is provided with a passage 10, preferably formed by a notch in its front edge, near its outer end; and with a second passage 11, preferably formed by a notch in its front edge, near its inner end; as clearly shown in Figs. 2 and 4. The passages 11 are progressively larger in the successive ribs from the bottom upward as indicated by dotted lines $11^a$ in Fig. 3; while the passages 10 are progressively larger in the successive ribs from the top down, as indicated by the dotted lines $10^a$ in Fig. 3; see Figs. 3 and 4. This is necessary with a bowl having a top feed in order that the milk entering through the apertures $2^d$ above the distributing plate $2^c$ shall be distributed evenly to all of the channels formed by the wings 6 and ribs 7. In the example shown the milk enters at top of the bowl and will pass through the passages 11 in the top ribs as indicated in Figs. 1 and 4, and part of the milk will move radially outward under such ribs, while part of the milk will pass down through the passages 11 in the next underlying ribs, where it is again divided, and a certain quantity moves radially outwardly while the balance moves downwardly. Thus the milk is divided until a certain proportion is discharged through the lowermost passage 11. The passages 11 are made to decrease in size from the top to the bottom to correctly divide the milk, so that each space between any pair of superposed ribs will receive approximately the same amount of milk as indicated by the arrows in Fig. 1 and dotted lines in Fig. 4.

The passages 10 similarly increase in size in the series of ribs from top to bottom in order to take care of the increasing amount of milk forced outwardly against the wall of the bowl 1. The above of course applies only when the milk is fed into the liner at the top of the bowl. If the milk was fed into the liner at the bottom of the bowl then the arrangements of the passages would be reversed or the liner would be turned upside down or reversed. In the construction shown the milk will be forced radially outward and then caused to pass down on its travel through the bowl through the passages 10 to the lower part of the bowl 1, from which it escapes to the discharge 3. Preferably the passages 10 and 11 are so formed in the ribs that they will not interfere with the inward flow of cream along the front surface of the wings.

As the separator is operated the milk will flow radially outward and the cream will flow radially inwardly or toward the center of the bowl, and if the passages 10, 11, extended to the bottom of the ribs the cream would be interfered with and remixed with the milk and forced through such passages; but instead the cream is caused to move properly toward the center of the bowl close against the wall of the wing and will be discharged in any suitable manner, the particular form of the discharge forming no part of the present invention.

The "cream wall," as it is termed, is indicated at W in Figs. 1—2, and in the construction shown lies just inside of the axial opening surrounded by the wings. It is impossible for liquid to fill in around the center tube in a bowl when the bowl is running rapidly, as it does when skimming; therefore the axial space S through the central portion of the bowl remains empty, the diameter of said space being determined by the distance of the cream outlet from the axis of the bowl; for instance if the cream outlet is ⅜" from the axis then the extreme diameter of the axial spaces within the cream wall will be double that, or 1¾". In practice the cream outlet should be so disposed as to make the cream wall (which is very thin) clear the inner edges of the wings but leave practically no space for the flow of milk, so that all the flow of milk must take place through the intended channels. When the bowl is in action, the cream wall W will be maintained the entire length of the bowl.

As indicated in Fig. 1 when the separator is in operation the heavy liquid or milk moves outward toward the periphery of the bowl, as indicated by the tailless arrows, while the lighter cream moves inward as indicated by the tailed arrows until the cream reaches the annular space at the inner end of the ribs where it forms a cream wall W and begins to rise as indicated by the tailed arrows until it reaches the cream outlet; the cream will form a complete annular wall surrounding the axis of the separator when the latter is in operation. The thickness of this wall depending upon adjustment of the cream outlet and the radial distance thereof from the true axis of the separator. This cream wall just clears the inner edges of the ribs which are preferably so cut as to form a true circle when the ribs are in operative position the cream wall just clearing the inner ends of the ribs.

It is to be noted that as the milk enters and passes downwardly through the various passages 11 the stream continually decreases as indicated by the dotted lines M in Fig. 4 as predetermined amounts are moved radially in the various channels between the various ribs 7. On the other hand, the stream of milk passing toward the exit through the passages 10 increases as indicated by the dotted lines M' in Fig. 4. By this construction and arrangement the milk cannot pass in a body directly from the inlet to the outlet, and does not have a straight free passage but must be operated upon by the skimming devices (wings 6 and associated parts) for producing the results desired. This even distribution of the milk throughout the bowl is exceedingly efficient, as all of the milk is acted upon equally, and no inert or dead zones are formed, every channel getting the same and equal amount of flow; and by dividing the inflowing milk into so many channels, the current or speed of flow is greatly reduced.

It will be seen by reference to Figs. 1 and 4 that I compel the milk to pass through the bowl in a novel manner. The ribs on the wings in my skimming device absolutely prevent any flow of fluid except where and as intended. The diminishing capacity of the passages 11 as well as the increasing capacity of the passages 10 in successive ribs is so designed that no space between any adjacent pair of ribs can carry more milk than any other such space. The milk enters at the ends of the wings, where the passages 11 are largest, and on account of the diminishing size of said openings, each space between opposed ribs will carry exactly the same amount of milk and at the same speed of flow as any one of the other spaces. If the liner has say twenty or more wings, (the number may be varied) and say six or eight channels between ribs on each wing, in such case the whole inflow of milk will be divided into about 160 channels and caused to flow evenly through each channel, and hence the flow in each and all the channels will be very slow, giving ample time for the cream to separate.

In my separator the arrangement of the passage ways preferably cut in the outer edge of each rib is important, these are so designed and arranged as to compel each part of the bowl, or each channel between the ribs to carry absolutely an equal amount of milk with all other parts. And by this very even distribution I get a very slow and even flow throughout the bowl.

The bowl may be either top or bottom skim, this is immaterial with the skimming device. However if it is a top skim bowl, the whole milk is passed to the bottom of the bowl first. And, in this event, the passage ways in the ribs would be just the reverse of the bowl shown, wherein the milk is admitted at the top of the bowl. If the milk is admitted at the bottom, then, the passage ways in the ribs would be largest beginning at the bottom at the inner part, and smallest at the outer end of the rib, but the principle would remain the same; therefore the skimming device is adapted to either style of bowl, there being no difference in regard to the principle.

What I claim is:

1. The herein described means of separating fluids such as milk and cream of different specific gravities, comprising a rotatable chamber having a superposed series of independent radial passages of similar size, whereby as the chamber is rotated the unseparated fluid flows through the passages, being sub-divided into a number of similar small currents, the lighter fluid being separated from the heavier fluid and passing toward the axis of the chamber, while the heavier fluid moves toward the periphery of said chamber; the inlets of said passages gradually decreasing in size from one end of the series toward the other, the outlets of said passages gradually increasing in size from one end of the series to the other, the outlet openings also increasing in size as the inlet openings diminish, whereby each passage is supplied with an equal amount of unseparated fluid, said openings being located upon one side of the bottom of each passage.

2. The herein described means of separating fluids of different specific gravities such as milk and cream, comprising a rotatable chamber containing a number of superposed series of similar independent radial passages each adapted to carry an equal amount of unseparated fluid, whereby as the chamber is rotated the lighter fluid is separated from the heavier fluid and passes toward the axis of the chamber, while the heavier fluid moves toward the periphery of said chamber, the said channels or passages having communicating openings adjacent one side of the bottom of each passage at its inlet and discharge ends, the openings at the inlet ends of said passages successively decreasing in area from one end of the series to the other, and the passages at the discharge ends of the channels gradually increasing in size from one end of the series to the other.

3. A fluid separator, comprising a rotatable body having a fluid inlet and a fluid outlet, and means in said chamber for dividing its interior into a large number of similar radially disposed passages or channels arranged in superimposed series and adapted to receive the unseparated fluid; each of said passages being provided with an inlet near its inner end and an outlet near its outer end; the inlets adjacent the inner ends of the passages gradually decreasing in size from one end of the superposed series of passages to the other, and the openings adjacent the outer ends of the passages gradually increasing in size from one end of the series to the other, reversely to the openings in the inner ends of the passages, said inlets and outlets adjacent one side of the bottom of each passage.

4. A fluid separator, comprising a rotatable body having a fluid inlet and a fluid outlet, and means in said chamber for dividing its interior into a large number of similar radially disposed passages or channels arranged in superimposed series and adapted to receive the unseparated fluid; each of said passages being provided with an inlet near its inner end and an outlet near its outer end; the inlets in the said passages successively decreasing in size as they are successively farther removed from the main fluid inlet; and the discharge openings in said channels successively increasing in size as the channels successively near the main fluid outlet, said inlets and outlets being located on one side of the bottom of each passage.

5. A centrifugal separator for fluids such as milk and cream comprising a rotatable body, a series of longitudinal radially disposed curved wings therein, a series of superposed ribs or partitions intermediate each adjacent pair of wings whereby the spaces between the wings are divided into numerous similar radial channels adapted to receive the unseparated fluid, said ribs having supply openings adjacent the axis of the body, and outlet openings adjacent the periphery of the body, the openings in the adjacent inner ends of the ribs gradually decreasing in size from one end of the superposed series of ribs to the other, and the openings adjacent the outer ends of the ribs gradually increasing in size from one end of the series to the other reversely to the openings in the inner ends of the series, said openings being spaced from the wings.

6. A centrifugal separator for separating fluids of different specific gravities such as milk comprising a rotatable body, a series of longitudinally arranged and radially disposed wings arranged within said body and extending from an opening adjacent the axis thereof to the periphery thereof, each wing having a plurality of parallel horizontally disposed ribs attached to one face thereof, said ribs having supply passages therein adjacent their inner ends, and outlet passages adjacent their outer ends, the ribbed wings when assembled forming a multiplicity of radially disposed similar separating channels within the chamber adapted to receive the unseparated fluid; and the inlet passages in said ribs gradually increasing in size from one end of the wings toward the other; and the outlet passages in said ribs gradually decreasing in size from one end of the wings to the other, whereby each channel between the ribs is compelled to carry an equal amount of flow, said passages being spaced from the wings.

7. In a separator, the combination with a bowl, of a liner provided with a plurality of wings, each of said wings having a plurality of ribs, forming channels adapted to receive the unseparated fluid, each provided with passages near its inner and outer ends for causing a uniform distribution and flow of milk passing through the bowl, said passages being spaced from the wing.

8. A skimming device of the character described comprising a plurality of wings each of which is provided with a plurality of uniformly spaced ribs forming channels adapted to receive the unseparated fluid, each of said ribs being provided with a milk passage near each end, said passages being spaced from the wing, substantially as described.

9. In a separator, the combination with a bowl, of a liner provided with a plurality of wings, each of said wings having a plurality of ribs forming channels adapted to receive the unseparated fluid each provided with passages near its inner and outer ends for causing a uniform distribution and flow of milk passing through the bowl, the passages in the ribs near one side of the wing increasing in size from top to bottom of the wing, and the passages in the ribs near the other side of the wing decreasing in size from top to bottom of the wing, said passages being spaced from the wing.

10. A skimming device of the character described comprising a plurality of wings each of which is provided with a plurality of uniformly spaced ribs forming channels adapted to receive the unseparated fluid, each of said ribs being provided with a milk passage near each end, said passages being spaced from the wing, the passages in the ribs near one side of the wing increasing in size from top to bottom of the wing, and the passages in the ribs near the other side of the wing decreasing in size from top to bottom of the wing, said passages being spaced from the wing.

11. A skimming device comprising a plurality of curved wings, and a series of spaced ribs on one face of each wing forming channels adapted to receive the unseparated fluid; means for holding said wings in position in a bowl so that the ribs of one wing will engage the next adjacent wing, each series of ribs being provided with passages adjacent their inner ends, decreasing in size from the top to the bottom of the series; and with passages adjacent their outer ends increasing in size from the top to the bottom of the series, or vice versa according to where the whole milk is admitted, whereby the passage of milk through the notches will not interfere with the flow of the cream.

12. A skimming device comprising a plurality of curved wings, and a series of spaced ribs on the outer face of each wing forming channels adapted to receive the unseparated fluid; means for holding said wings in position in a bowl so that the ribs of one wing will engage the next adjacent wing, each series of ribs being provided with passages adjacent their inner ends, decreasing in size from the top to the bottom of the series; and with passages adjacent their outer ends increasing in size from the top to the bottom of the series, whereby the passage of milk through the notches will not interfere with the flow of the cream, said passages being so disposed in the ribs that they are spaced from the wing, whereby the flow of milk through the passages will not interfere with the flow of the cream toward the axis of the liner, substantially as described.

13. A skimming device comprising a plurality of vertically disposed curved wings, each wing having a series of spaced ribs on one face forming channels adapted to receive the unseparated fluid, each of said ribs having a notch adjacent each end, the bottoms of said notches being spaced from the wing; the inner notches decreasing in size from the top to the bottom of the series of ribs and the outer notches increasing in size from the top to the bottom of the series of ribs.

14. In a separator of the character described, the combination of a bowl, with a plurality of vertically disposed curved wings arranged in said bowl and forming a liner therefor, each of said wings being provided with a series of horizontally disposed evenly spaced ribs on its convex face forming channels adapted to receive the unseparated fluid, each of said ribs having passages therein near its inner and outer ends, said openings being so arranged that the inner passages in the series decreases in size away from point of inflow, while the outer passages increase in size toward the exit of the flow, said passages being spaced from the wing.

15. In a separator of the character described, the combination of a bowl, with a plurality of vertically disposed curved wings arranged in said bowl and forming a liner therefor, each of said wings being provided with a series of horizontally disposed evenly spaced ribs on its convex face forming channels adapted to receive the unseparated fluid, each of said ribs having passages therein near its inner and outer ends, said openings being so arranged that the bottom thereof will be spaced from said wing and also arranged that the inner passages in the series decrease in size toward the bottom of the liner, while the outer passages increase in size toward the bottom of the liner, the sizes of said openings corresponding to the distance of the opening from the top of the liner whereby the milk is evenly distributed through said bowl.

In testimony that I claim the foregoing as my own, I affix my signature.

LEANDER J. HEDDERICH.